(12) United States Patent
Tamaki et al.

(10) Patent No.: US 8,932,072 B2
(45) Date of Patent: Jan. 13, 2015

(54) CHARGING DEVICE FOR ELECTRICALLY DRIVEN VEHICLE

(71) Applicant: Honda Motor Co., Ltd., Tokyo (JP)

(72) Inventors: Kenji Tamaki, Saitama (JP); Hiroki Ichikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 13/804,293

(22) Filed: Mar. 14, 2013

(65) Prior Publication Data
US 2013/0260595 A1    Oct. 3, 2013

(30) Foreign Application Priority Data
Mar. 27, 2012    (JP) .................. 2012-071276

(51) Int. Cl.
| | | |
|---|---|---|
| *H01R 13/627* | (2006.01) | |
| *B60L 11/18* | (2006.01) | |
| *B62J 99/00* | (2009.01) | |

(52) U.S. Cl.
CPC ........ H01R 13/6272 (2013.01); B60L 11/1818 (2013.01); B62J 99/00 (2013.01); *Y02T 10/7088* (2013.01); *Y02T 10/7005* (2013.01); *Y02T 90/121* (2013.01); *Y02T 90/14* (2013.01)
USPC ........................................ 439/345

(58) Field of Classification Search
USPC ............. 439/345, 304, 353, 352, 34; 324/402
See application file for complete search history.

(56) References Cited

U.S. PATENT DOCUMENTS

| | | | | |
|---|---|---|---|---|
| 5,491,418 A | * | 2/1996 | Alfaro et al. ........... | 324/402 |
| 6,225,153 B1 | * | 5/2001 | Neblett et al. ............ | 438/188 |
| 6,371,768 B1 | * | 4/2002 | Neblett et al. ........... | 439/34 |
| 7,878,866 B1 | * | 2/2011 | Kwasny et al. .......... | 439/695 |
| 7,963,793 B2 | * | 6/2011 | Poulin et al. ............ | 439/352 |
| 8,016,604 B2 | * | 9/2011 | Matsumoto et al. ...... | 439/304 |
| 8,016,607 B2 | * | 9/2011 | Brown, II ............... | 439/353 |
| 8,206,171 B2 | * | 6/2012 | Osawa et al. ............ | 439/352 |
| 8,206,172 B2 | * | 6/2012 | Katagiri et al. .......... | 439/352 |
| 8,317,534 B2 | * | 11/2012 | Osawa et al. ............ | 439/353 |
| 8,357,002 B2 | * | 1/2013 | Katagiri et al. .......... | 439/304 |
| 8,517,755 B2 | * | 8/2013 | Hirashita ............... | 439/304 |
| 8,562,370 B2 | * | 10/2013 | Takagi et al. ............ | 439/345 |
| 8,573,994 B2 | * | 11/2013 | Kiko et al. ............. | 439/188 |
| 2012/0108097 A1 | * | 5/2012 | Takagi et al. ............ | 439/345 |
| 2012/0252251 A1 | * | 10/2012 | Hirashita ............... | 439/304 |
| 2013/0260595 A1 | * | 10/2013 | Tamaki et al. ........... | 439/345 |

FOREIGN PATENT DOCUMENTS

JP                3135040 B2    12/2000

* cited by examiner

*Primary Examiner* — Alexander Gilman
(74) *Attorney, Agent, or Firm* — Carrier Blackman & Associates, P.C.; William D. Blackman; Anne G. Sabourin

(57) ABSTRACT

A charging device starts charging a battery mounted on an electrically driven vehicle in accordance with simplified operating steps. A charging supply connector is connected to a charging port mounted on a vehicle body side. The charging supply connector includes a lock lever displaceable between a locking position, for engagement with a hook mounted on the charging port, and a lock release position where the lock lever is released from the hook. The lock lever is spring-biased to the locking position. A manipulation lever is connected to the lock lever by a link, and is operable to move the lock lever between the locking position and the lock release position. When the lock lever is at the lock release position, the lock lever, the link or the lock lever and the link interferes with an operation range of a charging start switch, to prevent operation thereof.

19 Claims, 9 Drawing Sheets

| state | display means | connected | charging started | charging stopped | charging completed | separated |
|---|---|---|---|---|---|---|
| normal | sound | one short bleeping sound (0.2SEC one time) | two short bleeping sounds (0.2SEC two time) | long bleeping sound (bleeping for 1 sec × 3) | long bleeping sound (bleeping for 1 sec × 1) | – |
| | light | flickered (1Hz) | turned on | turned off | – | – |

FIG. 9

CHARGING DEVICE FOR ELECTRICALLY DRIVEN VEHICLE

CROSS-REFERENCE TO RELATED APPLICATIONS

The present invention claims priority under 35 USC 119 based on Japanese patent application No. 2012-071276, filed Mar. 27, 2012. The entire subject matter of this priority document, including specification claims and drawings thereof, is incorporated by reference herein.

BACKGROUND OF THE INVENTION

1. Field of the Invention

The present invention relates to a charging device for an electrically driven vehicle, and more particularly to a charging device in which a charging supply connector is connected to a vehicle-mounted charging port during battery charging.

2. Background Art

In a charging device for charging a battery mounted on an electrically driven vehicle from the outside of the electrically driven vehicle, there has been known a charging device where charging is started by turning on a switch of a charger after connecting a charging supply connector to a charging port on a vehicle side. For example, Patent Document 1 discloses a charging device which is constituted of a power-supply-side connector B which is connected to a power-receiving-side connector A and a charger C which is connected to the power-supply-side connector B, and is configured such that the energization is started by turning on a switch mounted on the charger C. [Patent Document 1] Japanese Patent 3135040

Problems that the Invention is to Solve

In the charging device described in patent Document 1, the switch for starting the current transfer is mounted on the charger C, which constitutes a charger body, and hence, charging is performed in accordance with steps where the power-supply-side connector B is connected to the power-receiving-side connector A and, thereafter, the switch on the charger C arranged at a position away from the power-supply-side connector B is manipulated. That is, the connector connecting manipulation and the switch manipulation are performed separately and therefore, two separate steps are required to start changing.

SUMMARY OF THE INVENTION

Accordingly, it is an object of the present invention to provide a charging device, for an electrically driven vehicle, which can start charging in accordance with a minimal number of operational steps in view of the above-mentioned task of the known art.

Throughout the present specification, reference numbers refer to the exemplary structures shown in the drawings, and such numbers are intended to illustrate, rather than to limit the invention.

To achieve the above-mentioned object, in a charging device for an electrically driven vehicle including a charging port (44) mounted on a vehicle body side and a charging supply connector (43) connected to the charging port (44), the present invention has the first technical feature that the charging supply connector (43) includes: a lock lever (16) which is displaceable between a locking position where the lock lever (16) is engaged with a hook (30) mounted on the charging port (44) and a lock release position where engagement between the lock lever (16) and the hook (30) is released; a manual manipulation lever (12) which is provided for displacing the lock lever (16) to the lock release position from the locking position; a connecting member (23) which connects the manipulation lever (12) and the lock lever (16) to each other; a resilient member (13) which biases the lock lever (16) to the locking position; and a charging start switch (14) which outputs a charging start instruction, and the lock lever (16) and the connecting member (23) are arranged such that, when the lock lever (16) is at the lock release position, at least one of the lock lever (16) and the connecting member (23) interferes with an operation range of the charging start switch (14) thus inhibiting an operation of the charging start switch (14).

The present invention has the second technical feature that the connecting member (23) is a link, and the connecting member (23) is arranged such that, when the lock lever (16) is at the lock release position, the link (23) interferes with the operation range of the charging start switch (14).

The present invention has the third technical feature that the charging start switch (14) is constituted of a manipulation button (141) and a switch body (142) which opens or closes a contact in response to pushing-down or returning of the manipulation button (141), and the operation range of the charging start switch (14) is an operation range of the manipulation button (141).

The present invention has the fourth technical feature that a distal end portion (16a) of the lock lever (16) is formed into a hook shape such that the distal end portion (16a) is engaged with a hook (30) mounted on the charging port (44), and a gradient is provided to the hook (30) and a front surface of the hook-shaped distal end portion (16a) such that the hook-shaped distal end portion (16a) of the lock lever (16) moves over the hook (30) and advances to the locking position where the hook-shaped distal end portion (16a) is engaged with the hook (30) when the charging supply connector (43) and the charging port (44) are connected to each other.

The present invention has the fifth technical feature that the charging supply connector (43) and the charging port (44) are electrically connected to each other when the hook-shaped distal end portion (16a) moves over the hook (30) and is at the locking position.

The present invention has the sixth technical feature that the charging device includes, for detecting that the charging supply connector (43) and the charging port (44) are electrically connected to each other, a circuit tester which applies an identification voltage for connection detection to an output terminal of a charger (60) which is connected to the charging supply connector (43), and an electronic controller which includes a connection detection part which determines that the charging supply connector (43) and the charging port (44) are electrically connected to each other in response to the detection of lowering of the identification voltage, and a drive part of a display readout (49) which displays that the charging supply connector (43) and the charging port (44) are electrically connected to each other.

The present invention has the seventh technical feature that the electronic controller has a function of starting charging in response to an ON manipulation of the charging start switch (14).

The present invention has the eighth technical feature that the display readout (49) is mounted on the charging supply connector (43), and the electronic controller includes a switch position sensor for detecting that the charging start switch (14) is turned on, and the display readout (49) is configured to display a function of displaying that the electrical connection is established and a function of displaying that charging is started in response to an ON manipulation of the charging start switch (14) in different modes from each other.

Advantages of the Invention

According to the inventions having the first, second and third technical features, the lock lever is arranged such that, when the lock lever is at the lock release position, at least one of the lock lever and the connecting member (link) interferes with the operation range of the charging start switch thus inhibiting an operation of the charging start switch. Accordingly, it is possible to prevent a case where the charging start switch is manipulated erroneously when the lock lever is at the lock release position.

According to the invention having the fourth technical feature, the lock lever is displaced so as to be engaged with the hook of the charging port by merely inserting the charging supply connector into the charging port.

According to the invention having the fifth technical feature, an operator who manipulates the charging supply connector can establish the electrical connection by merely inserting the charging supply connector up to a position where the lock lever is engaged with the hook of the charging port by displacing the lock lever. Accordingly, the operator who manipulates the charging supply connector can feel the reliability of electrical connection due to a response (click feeling) that the distal end portion of the lock lever moves over the hook.

According to the invention having the sixth technical feature, the establishment of the electrical connection can be recognized in response to the detection of the lowering of an identification voltage.

According to the invention having the seventh technical feature, the charging start switch becomes ready for an ON manipulation at a point of time that the charging supply connector is connected to the charging port and inserted up to a locking position, and charging is started when the charging start switch is turned on.

According to the invention having the eighth technical feature, a rider can recognize, by the display performed by the display indicia mounted on the charging supply connector, that the charging supply connector is connected to the charging port, and that charging start switch is turned on due to the connection of the charging supply connector to the charging port.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 9 is a chart showing exemplary sound and light signal signals for indicating a state of the charging device hereof.

DETAILED DESCRIPTION

Figure 1:
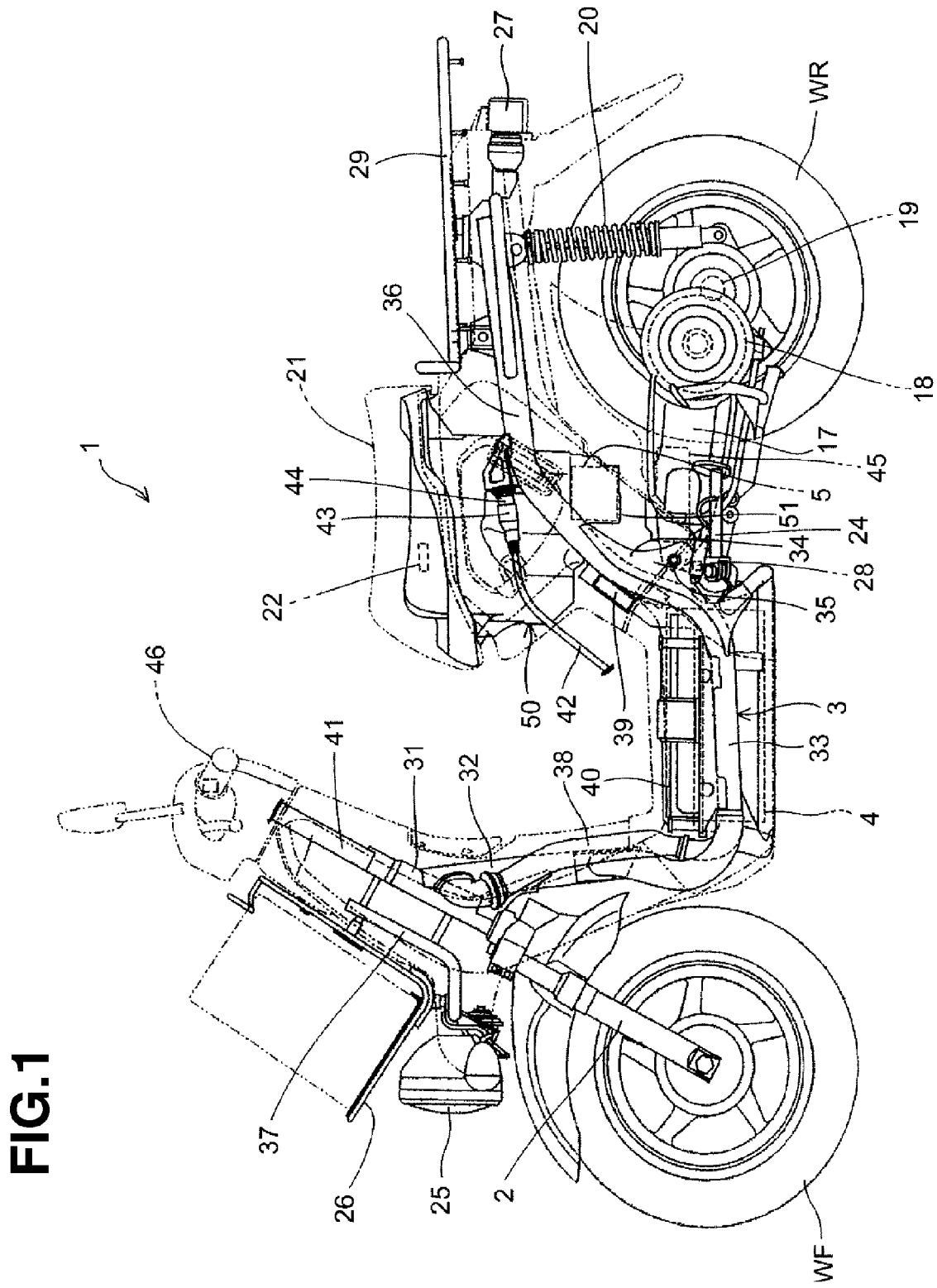
FIG. 1 is a left side view of an electrically driven vehicle including a charging device according to an illustrative embodiment of the present invention.

Hereinafter, one embodiment of the present invention is explained in conjunction with the accompanying drawings. FIG. 1 is a left side view of an electrically-driven vehicle 1, which includes a charging device according to one embodiment of the present invention. An electrically driven vehicle 1 is a scooter-type motorcycle having a low floor. A vehicle body frame 3 includes a head pipe 31 and a front frame portion 32, which has a distal end joined to the head pipe 31, and which also has a rear end extending downwardly. The vehicle body frame 3 also includes a pair of main frame portions 33 bifurcated leftward and rightward, respectively, in the widthwise direction of a vehicle body from the front frame portion 32, and extending to an area near a rear side of the vehicle body; and a rear frame portion 36 which extends to an upper and rear side of the vehicle body from the main frame portions 33.

A front fork 2, which supports a front wheel WF thereon, is pivotally and steerably supported on the head pipe 31. A steering handlebar 46, having a throttle grip thereon, is connected to an upper portion of a steering shaft 41, which extends upwardly from the front fork 2, and is supported on the head pipe 31.

A bracket 37 is joined to a front portion of the head pipe 31, a headlight 25 is mounted on a front end portion of the bracket 37, and a front carrier 26 which is supported on the bracket 37 is arranged above the headlight 25.

A bracket 34 which extends toward the rear side of the vehicle body is joined to the vehicle body frame 3 at an intermediate region between the main frame portion 33 and the rear frame portion 36, and a pivot shaft 35 which extends in the widthwise direction of the vehicle body is mounted on the bracket 34. The pivot shaft 35 supports a swing arm 17 which includes a motor 18 as a drive source of the vehicle and a rear-wheel axle 19 in a vertically swingable manner.

An output of the motor 18 is transmitted to the rear-wheel axle 19 so as to drive a rear wheel WR which is supported on the rear-wheel axle 19. A rear end of a housing, which supports the rear-wheel axle 19, and the rear frame portion 36 are connected to each other by a rear suspension 20.

A side stand 24, which supports the vehicle body during stopping of the vehicle, is mounted on the bracket 34. The side stand 24 includes a side stand position sensor switch 28, which outputs a detection signal when the side stand 24 is retracted to a predetermined position.

A main battery 4 of a high voltage (for example, a rated voltage of 72V) which is formed of a plurality of battery cells is mounted on the main frame portions 33, and an upper portion of the main battery 4 is covered with a cover 40. An air-introducing pipe 38 is connected to a front portion of the main battery 4, and an air suction fan 39 is mounted on a rear portion of the main battery 4. Air is introduced into the main battery 4 from the air-introducing pipe 38 by operating the air suction fan 39. The introduced air cools the main battery 4 and, thereafter, is discharged to a rear side of the vehicle body. Air is introduced into the air-introducing pipe 38 through an air cleaner (not shown in the drawing). A rear carrier 29 and a tail light 27 are mounted on the rear frame portions 36.

A charging port 44 is mounted on an upper portion of the rear frame portion 36. The charging port 44 is configured and adapted to matingly receive an end portion of a charging supply connector 43 for charging the main battery 4 of the vehicle 1. The charging supply connector 43 is disposed at the end of a charging cable 42, which extends from an external battery charger 60 (FIG. 7) arranged outside of, and separate from the vehicle 1.

A storage chamber 50 is arranged between the pair of left and right rear frame portions 36, and a supplemental battery 5 of a low voltage (for example, a rated voltage of 12V), which is charged by the main battery 4, is housed in a storage-chamber bottom portion 51 which projects downwardly in the storage chamber 50. A power drive unit (PDU) 45 which controls the motor 18 is mounted on the swing arm 17.

A rider's seat 21, which also functions as a lid for the storage chamber 50, is arranged above the storage chamber 50, and a seat switch 22, which is operated when a rider sits on the rider's seat 21 and outputs a sitting signal, is mounted on the rider's seat 21.

Figure 2:
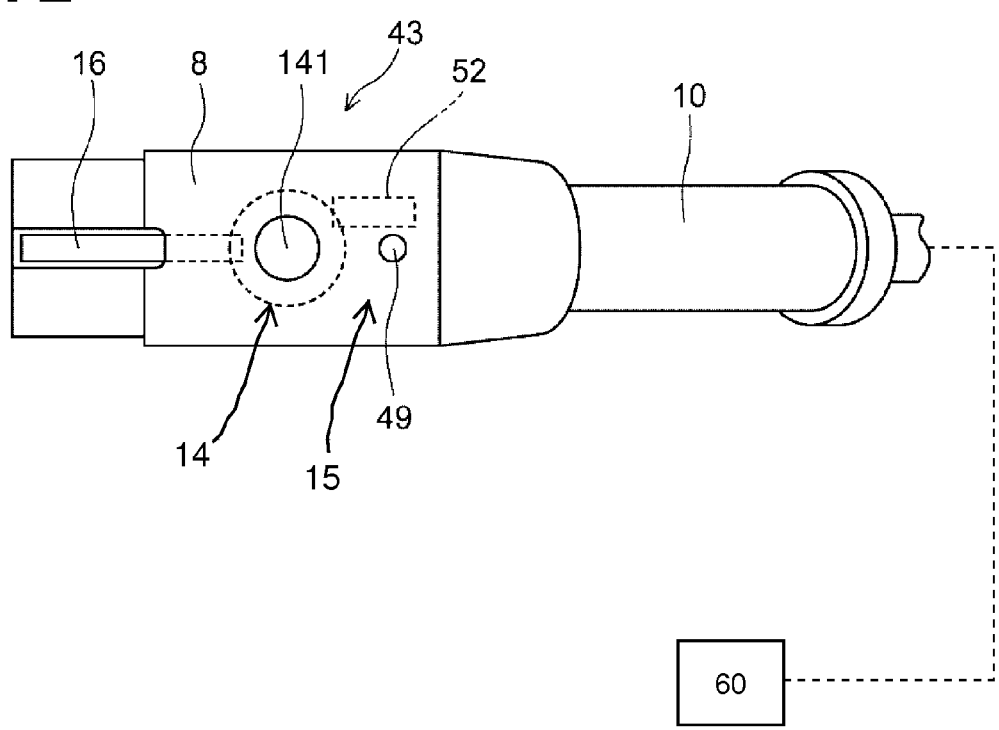
FIG. 2 is a top plan view of a charging supply connector according to an illustrative embodiment of the present invention, which is provided for charging the vehicle of FIG. 1.
Figure 3:
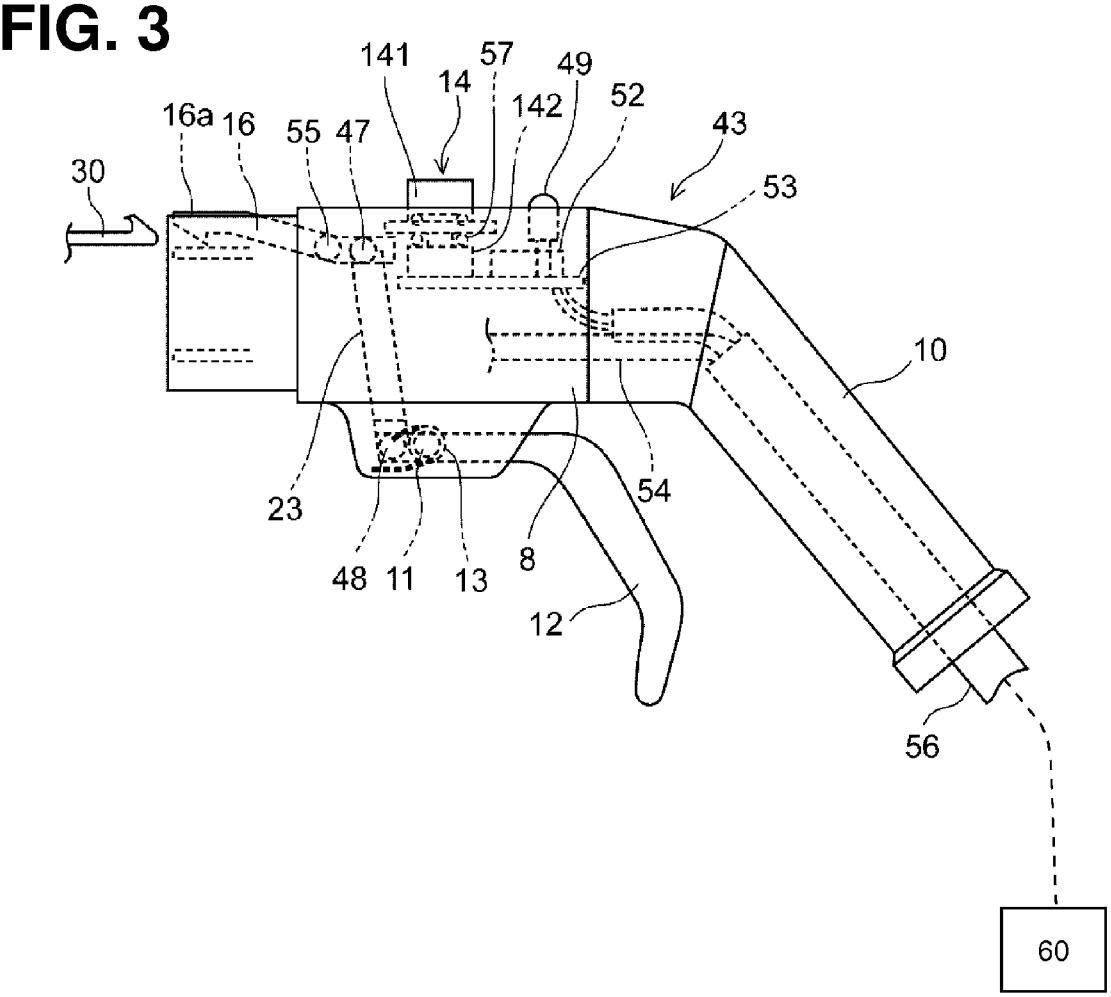
FIG. 3 is a left side view of the charging supply connector.

FIG. 2 is a top plan view showing the external appearance of the charging supply connector 43, which is a component part of the charging device according to this embodiment, and FIG. 3 is a side plan view of the charging supply connector. The charging supply connector 43 includes a main connector body 8 and a handle grip portion 10, which is integrally formed with and extends from the main connector body 8. The charging supply connector 43 also includes a manipulation lever 12 which is pivotally supported on the main connector body 8 by a pivot shaft 11. As shown in FIG. 3, a main part of the manipulation lever 12 extends in a direction substantially parallel to a central axis of the handle grip portion 10. The manipulation lever 12 is biased by a spring 13 in a direction away from the handle grip portion 10 (in a direction toward a "locking position" described later). The spring 13 is arranged around the pivot shaft 11.

A charging start switch 14 and a display area 15 are mounted on an upper portion of the main connector body 8. The charging start switch 14 may be characterized as an on/off switch or charging start/stop switch. That is, the charging start switch 14 may be constituted such that charging is stopped when the switch 14 is pressed during charging. In FIG. 2, the external appearance of the charging start switch 14 is shown. That is, a manipulation button 141 is shown. A switch body 142 which opens or closes a contact in response to the pushing-down or returning of the manipulation switch 141 is arranged below the manipulation button 141.

A lock lever 16, which is pivotally supported on a pivot shaft 55 and is swingable in the vertical direction, is arranged in the main connector body 8, and the lock lever 16 and the manipulation lever 12 are connected to each other by a link 23 using connecting shafts 47, 48. A distal end portion 16a of the lock lever 16 is formed into a hook shape, so as to be engageable with a corresponding hook-shaped member (hook) 30 mounted in the charging port 44.

Further, an LED 49 is mounted on an upper portion of the main connector body 8 adjacent to the charging start switch 14 as a charging state indicator. The indicator is provided for displaying a charging state and an electrical connection state between the charging supply connector 43 and the charging port 44. As another indicator, besides the LED 49 which performs a display using light, an electronic buzzer 52 which provides a signal using sounds may be provided. The charging start switch 14, the LED 49 and the electronic buzzer 52 are mounted on a printed circuit board 53. A signal line pulled out from the charging start switch 14 and electric lines for supplying power to the LED 49 and the electronic buzzer 52 are, together with a charging power line 54, covered with a sheath, and extend to the charger 60 in the form of a harness 56. A return spring 57, which acts in the direction of pushing up the manipulation button 141, is arranged between the manipulation button 141 and the printed circuit board 53.

Figure 4:
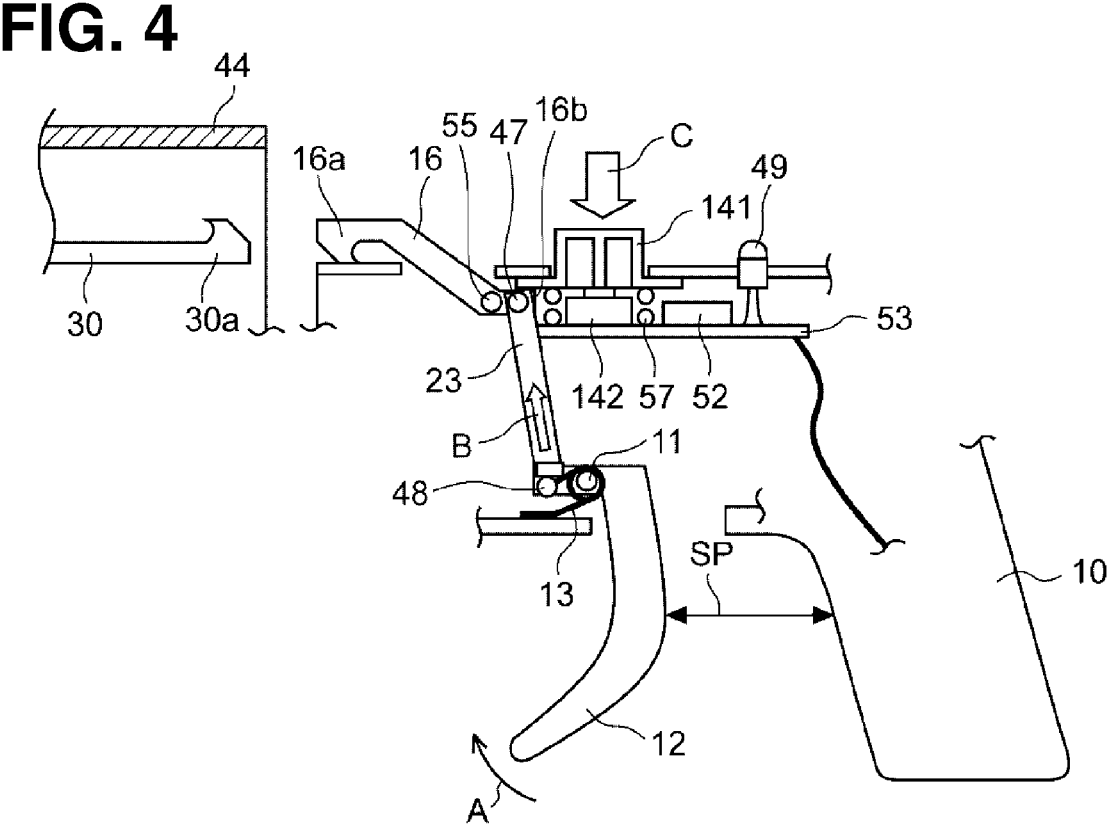
FIG. 4 is a schematic view showing an operation of a lock lever of the charging supply connector.
Figure 5:
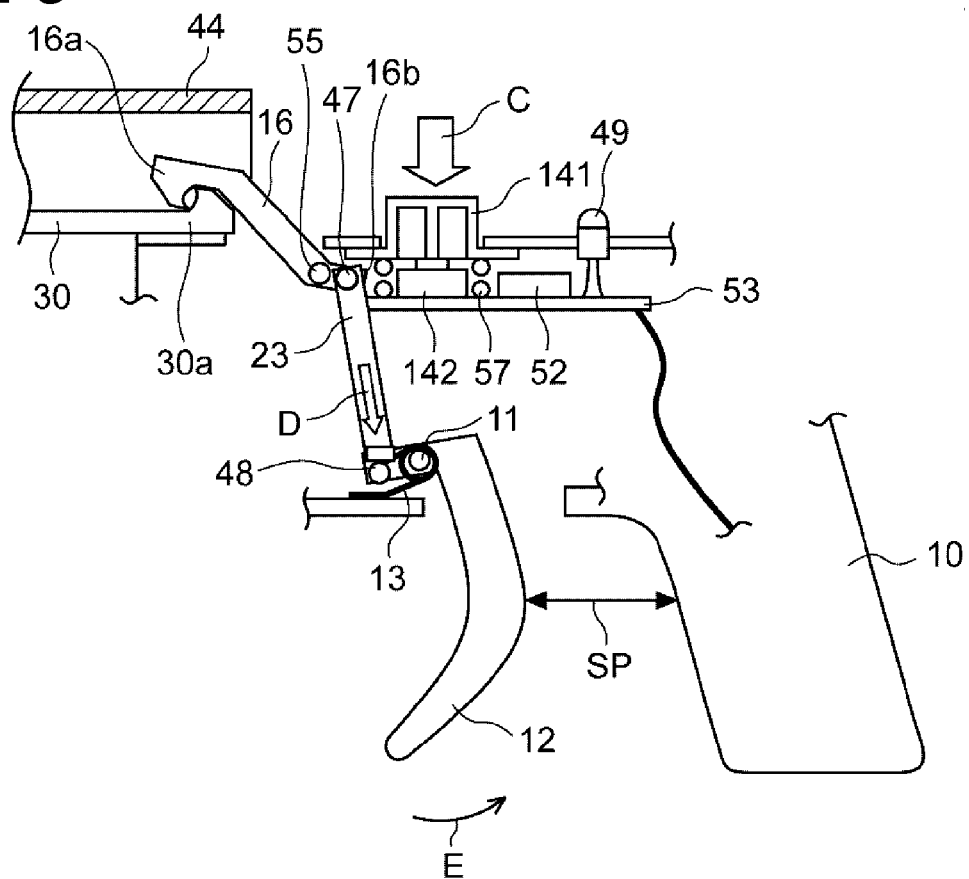
FIG. 5 is a schematic view showing an operation of the lock lever of the charging supply connector.
Figure 6:
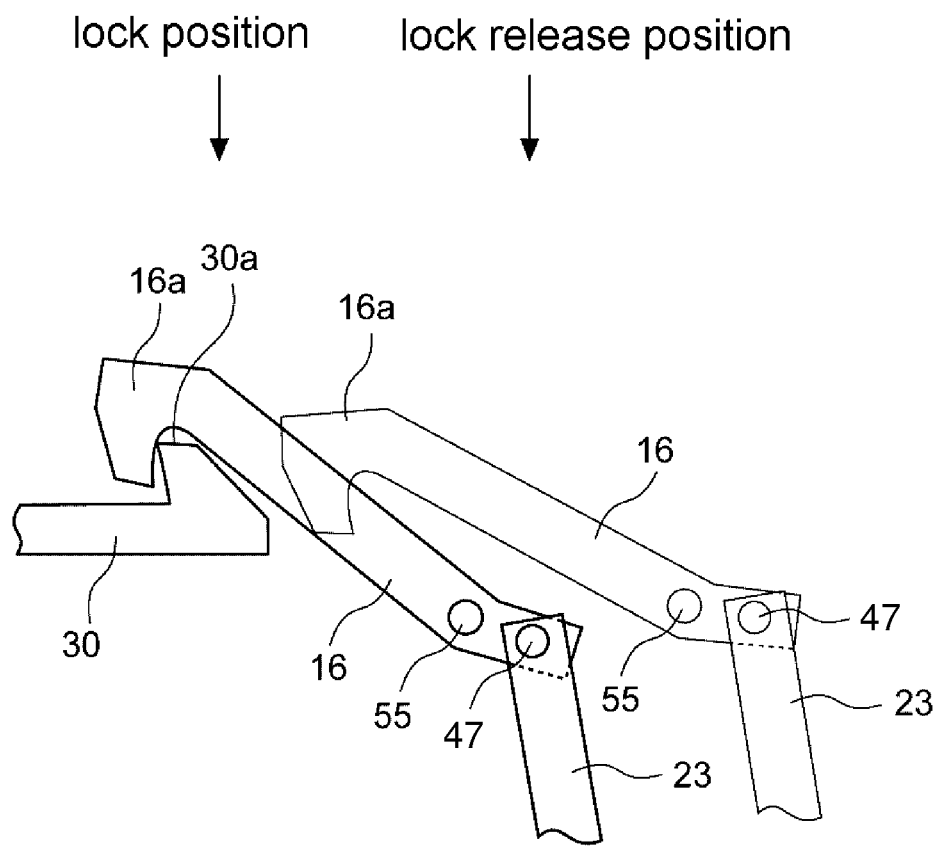
FIG. 6 is an enlarged detail view showing an operation of the lock lever with respect to a hook on a vehicle side.

Next, the manner of connecting the charging supply connector 43 and the charging port 44 to each other and the manner of operation of the manipulation lever 12 and the lock lever 16 are explained in conjunction with FIG. 4 and FIG. 5. FIG. 4 shows positions of the respective members when the lock lever 16 is at a lock release position, FIG. 5 is an enlarged view showing the lock lever 16 is at an intermediate position between the lock release position and the locking position, and FIG. 6 is a schematic view showing the positions of the respective members when the lock lever 16 is at the locking position.

The manipulation lever 12 is biased by the spring 13 about the pivot shaft 11 in the clockwise direction as indicated by an arrow A in FIG. 4. The manipulation lever 12 extends beyond the pivot shaft 11, that is, toward a distal end portion (a left side in the drawing) of the main connector body 8, and one end (lower end) of the link 23 is connected to an extending portion of the manipulation lever 12 by the connecting shaft 48.

On the other hand, the lock lever 16 extends beyond the pivot shaft 55, that is, toward a right side in the drawing, and the other end (upper end) of the link 23 is connected to the extending portion 16b of the lock lever 16 by the connecting shaft 49. The extending portion 16b of the lock lever 16 extends to an area below a lower edge of the manipulation button 141.

Due to such a constitution, in a state shown in FIG. 4, the manipulation lever 12 is biased by the spring 13 and hence, the link 23 which is connected to the manipulation lever 12 is displaced upwardly as indicated by an arrow B. Accordingly, the extending portion 16b of the lock lever 16 is pushed up along with the displacement of the link 23 so that the lock lever 16 is rotated in the counterclockwise direction about the pivot shaft 55.

Due to such an operation, the distal end portion 16a of the lock lever 16 is displaced downwardly and is brought into contact with an outer peripheral surface of a guide cylinder 431 of the charging supply connector 43 which is positioned below the distal end portion 16a of the lock lever 16. On the other hand, the extending portion 16b of the lock lever 16 is rotated in the counterclockwise direction about the pivot shaft 55, and is displaced to a position directly below the edge of the manipulation button 141.

Accordingly, when the lock lever 16 assumes the position shown in FIG. 4, the lock lever 16 interferes with an operation range of the manipulation button 141 and hence, an operation of pushing down the manipulation button 141 in the direction indicated by an arrow C is prevented. In a lock release state shown in FIG. 4, the manipulation lever 12 is at a position where the manipulation lever 12 is rotated in the clockwise direction, so that a distance SP between the manipulation lever 12 and the handle grip portion 10 is widened.

As a result, the manipulation lever 12 and the handle grip portion 10 have the positional relationship where it is difficult for a user to grip the manipulation lever 12 and the handle grip portion 10 together, so that the erroneous manipulation of the manipulation lever 12 hardly occurs. Accordingly, it is possible to prevent a case where the manipulation lever 12 is manipulated so as to operate the charging start switch 14 in a state where the charging supply connector 43 is disconnected from the charging port 44.

When the charging supply connector 43 is pushed into the charging port 44 for initiating a connection between the charging supply connector 43 and the charging port 44, as shown in FIG. 6, a distal-end upper portion 30a of the hook 30 which forms an inclined surface is brought into contact with an upper inclined surface 16c of the distal end portion 16a of the lock lever 16 so that the lock lever 16 is pushed up.

Then, when the charging supply connector 43 is further pushed into a charging port 44 side, as shown in FIG. 6, the distal end portion 16a of the lock lever 16 moves over the distal-end upper portion 30a of the hook 30 from a right side to a left side of the drawing, and the lock lever 16 and the hook 30 whose distal ends are respectively formed into a hook shape are engaged with each other so that the charging supply connector 43 is connected to the charging port 44 while maintaining a locked state.

At the locking position where the hook 30 and the distal end portion 16a of the lock lever 16 are engaged with each other, the lock lever 16 is rotated in the clockwise direction about the pivot shaft 55 when compared to the lock release position and, as shown in FIG. 5, the extending portion 16b of the lock lever 16 leaves from a position directly below the manipulation button 141 and is lowered to a position where the extending portion 16b of the lock lever 16 does not interfere with an operation range of the manipulation button 141. As a result, the charging start manipulation can be manipulated by pushing down the manipulation button 141. At the position shown in FIG. 5, the lock lever 16 is rotated so that the link 23 is lowered in the direction indicated by an arrow D and hence, the manipulation lever 12 is rotated in the counterclockwise direction about the pivot shaft 11 (in the direction indicated by an arrow E) and approaches a handle grip portion 10 side whereby the distance SP is gradually decreased.

A power-supply-line terminal and a signal-line terminal are provided to the charging supply connector 43 and the charging port 44 respectively. At a position where the distal end portion 16a of the lock lever 16 moves over the distal-end upper portion 30a of the hook 30 and is engaged with the hook 30, the power-supply-line terminals and the signal-line terminals are respectively connected to each other thus enabling the supply of power and transmission/reception of signals between the charger and the charge control device on a vehicle body side.

When the charging supply connector 43 is removed from the charging port 44, the manipulation lever 12 is drawn toward the handle grip portion 10 side. When the lock lever 16 is at the locking position, the manipulation lever 12 is already drawn toward the handle grip portion 10 side and hence, the user can easily perform the manipulation of bringing the manipulation lever 12 close to the handle grip portion 10 by gripping the manipulation lever 12 and the handle grip portion 10 together.

By manipulating the manipulation lever 12 such that the manipulation lever 12 is drawn toward the handle grip portion 10, the link 23 is displaced downwardly, the lock lever 16 is rotated in the clockwise direction about the pivot shaft 55, and the distal end portion 16a is lifted upwardly from the distal-end upper portion 30a of the hook 30 and hence, the locking of the lock lever 16 is released whereby the charging supply connector 43 can be removed from the charging port 44 by pulling. When the user releases his hand from the manipulation lever 12 after removing the charging supply connector 43 from the charging port 44, the link 23 is lifted due to an action of the spring 13, and the extending portion 16b of the lock lever 16 returns again to a position where the extending portion 16b interferes with the operation range of the manipulation button 141.

Figure 7:
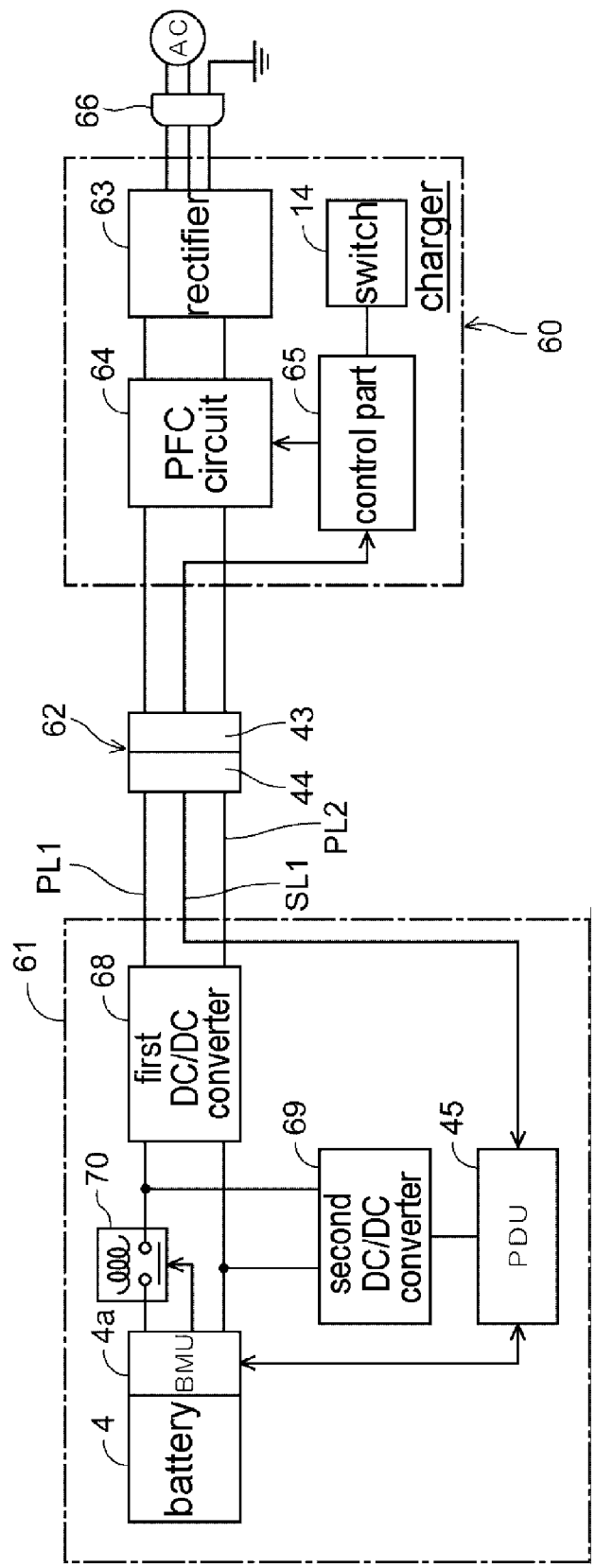
FIG. 7 is a schematic block diagram showing the constitution of a charge control device.

Next, the charge control device including the charging supply connector is explained. FIG. 7 is a block diagram showing the constitution of the charge control device. A charger 60 and a power supply device 61 on an electrically driven vehicle 1 side which constitute the charge control device are connected to each other by a charging coupler 62 which is constituted of the charging supply connector 43 and the charging port 44. The power supply device 61 includes a circuit for controlling power to be supplied to the motor 18 by the PDU 45 and for charging the battery 4. The charger 60 and the power supply device 61 are connected to each other by power lines PL1, PL2 and a signal line SL1 via the charging coupler 62.

The charger 60 includes a rectifier 63, a PFC circuit 64 and a control part 65. The rectifier 63 includes a filter circuit and a rectifying circuit, and rectifies a voltage which is inputted from a commercial AC power system via an AC plug 66 to a direct current. The PFC circuit 64 is an output circuit which boosts the direct current inputted from the rectifier 63 and supplies a boosted direct current to the power supply device 61 on the vehicle side.

The control part 65 which includes a microcomputer always monitors an output voltage of the PFC circuit 64 and performs a constant voltage control so as to prevent the output voltage from surpassing a set voltage (for example, 400V). The charging start switch 14 is connected to the control part 65. Further, the control part 65 has a charging start/stop function where the control part 65 starts charging in response to a connection detection signal indicative of the connection of the charging coupler 62 or stops charging in response to a charging stop signal transmitted from a vehicle side via the signal line SL1. In this embodiment, charging is started in a state where the charging supply connector 43 is inserted into the charging port 44 so that the charging coupler 62 is locked in a connection state, a connection detection signal is recognized, and the charging start switch 14 is also turned on.

The power supply device 61 includes the main battery 4 having a battery management unit (BMU) 4a, the PDU 45, a first DC/DC converter 68, and a second DC/DC converter 69. The first DC/DC converter 68 drops an input voltage (400V in this embodiment) to a charging voltage (72V) for the battery 4 and outputs the dropped voltage. An output side of the first DC/DC converter 68 is connected to the battery 4 and the second DC/DC converter 69. The second DC/DC converter 69 drops a direct current of 72V outputted from the first DC/DC converter 68 to a low voltage (for example, a direct current of 12V) which can be used as the power source for controlling the PDU 45 or the like.

The PDU 45 includes a microcomputer, and transmits and receives a charging state (overcharge information or the like) of the battery 4 and information on a control of the battery 4 corresponding to a charging state of the battery 4 through the communication (for example, CAN communication) with the BMU 4a. Here, the PDU 45 and the control part 65 of the charger 60 are connected to each other via the signal line SL1. A DC output voltage of the battery 4 is converted into a three-phase AC voltage via an inverter circuit not shown in the drawing which is mounted on the PDU 45, and is inputted to the motor 18 which constitutes a drive source for the vehicle (see FIG. 1). A contactor 70 is arranged between the BMU 4a which is mounted on the battery 4 and the first DC/DC converter 68.

Figure 8:
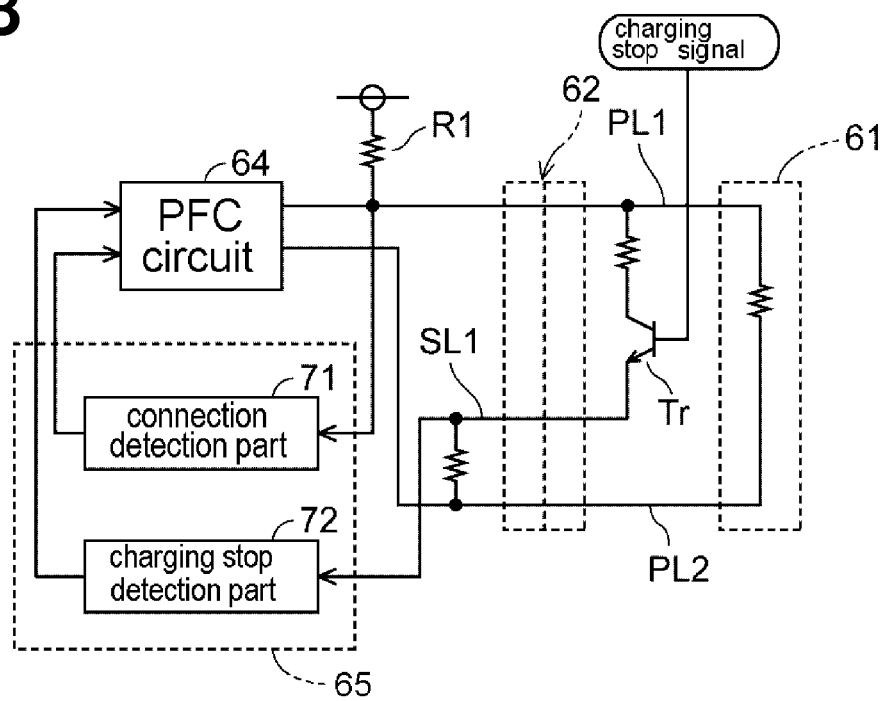
FIG. 8 is a schematic block diagram showing a function of a control apparatus.

FIG. 8 is a block diagram showing functions of the charge control device including a connection detection part which detects that the charger 60 and the power supply device 61 are connected to each other. As shown in FIG. 8, an identification voltage is applied to an output terminal of the PFC circuit 64 (an output terminal of the charger 60) via a current limiting resistance R1, and the identification voltage applied to the output terminal is monitored by a connection detection part 71. When the charging coupler 62 is connected, an electric current flows in the first DC/DC converter 68 in the power supply device 61 and hence, the identification voltage drops. The connection detection part 71 recognizes that the charging coupler 62 is connected in response to the detection of such a voltage drop.

In the power supply device 61 on the vehicle side, the signal line SL1 is connected to the power line PL1 via a transistor Tr and, at the time of finishing the charging, the PDU 45 turns on the transistor Tr. A charging stop detection part 72 of the control part 65 monitors a potential of the signal line SL1 and, when the transistor Tr is turned on in response to a charging stop signal inputted from the PDU 45, a voltage of the signal line SL1 is changed to a predetermined value. The charging stop detection part 72 recognizes the inputting of the charging stop signal in response to the detection of such a voltage change of the signal line SL1 and stops the outputting from the PFC circuit 64.

In this manner, according to the charge control device of this embodiment, the charger 60 can start the charging in response to the detection of the presence or the non-presence of the connection between the charging supply connector 43 and the charging port 44 of the charging coupler 62 based on a voltage drop of the identification signal applied to the charging coupler 62. Further, the PFC circuit 64 of the charger 60 outputs a constant voltage until an output limit thereof and hence, the PDU 45 can increase a charging current until the output voltage from the charger 60 drops. Accordingly, the charger 60 can supply a charging current to the battery 4 with a maximum output.

A charging state is displayed by the LED 49 and the electronic buzzer 52 which constitute the charging state indicators in response to the operation of the charge control device explained in conjunction with FIG. 7 and FIG. 8. FIG. 9 is a view which shows the relationship between a state of the charging device and a display by the charging state indicators. A drive function of the charging state indicators can be realized as a function of the control part 65. As shown in FIG. 9, when the connection detection part 71 detects the connection of the charging coupler 62, the electronic buzzer 52 generates a sound lasting for a time t1 (for example, 0.2 seconds) one time, and the LED 49 is made to flicker at a predetermined cycle T (for example, 1 Hz). When the PFC circuit 64 is operated so that the charging is started, the electronic buzzer 52 generates a sound lasting for a time t1 twice and the LED 49 is continuously held in an ON state. Further, when the charging is stopped before the battery is fully charged, the electronic buzzer 52 generates a sound lasting for a time t2 longer than the time t1 (for example, 1.0 second) three times, and the LED 49 is turned off. Then, when the charging is completed, the electronic buzzer 52 generates a sound lasting for a time t2 one time. When the charging coupler 62 is disconnected, the electronic buzzer 52 does not generate a sound, and the LED 49 performs neither lighting nor flickering.

The charging state indicators can also display an abnormal operation (failure). For example, when a failure is detected, a sound lasting for a time t2 is generated three times and the LED 49 flickers at a cycle T. For example, when the connection detection part 71 detects a voltage different from a predetermined voltage or does not detect any voltage, such a case is determined as a failure. A display mode of the display readout is not limited to such cases, and the condition of the charging state may be performed using only either one of the LED 49 and the electronic buzzer 52.

Further, in this embodiment, the extending portion 16*b* of the lock lever 16 and the upper portion of the link 23 interfere with the operation range of the manipulation button 141 so as to restrict the manipulation of the manipulation button 141. However, the present invention is not limited to such a constitution. That is, it is sufficient that the charging start switch 14 and the movable part are arranged such that, when the manipulation lever 12 is at the position shown in FIG. 4, a portion of the movable part including the lock lever 16, the link 23, and the manipulation lever 12 is at a position where the portion interferes with an operation range of the manipulation button 141, and when the manipulation lever 12 is manipulated so as to assume a state shown in FIG. 5 (the locking position) by pulling, the portion of the movable part which is at the position where the portion interferes with the operation range of the manipulation button 141 moves to the outside of the operation range of the manipulation button 141.

Further, the connector between manipulation lever 12 and the lock lever 16 is not limited to the link 23, and the manipulation lever 12 and the lock lever 16 may alternately be connected to each other using a cam mechanism or a gear mechanism.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

We claim:

1. A charging connection device for an electrically driven vehicle,
   comprising in combination, a charging port adapted to be mounted on a body of said vehicle, and a charging supply connector for electrically connecting an external battery charger to the charging port,
   wherein the charging supply connector comprises:
   a lock lever which is displaceable between a lock position, where the lock lever engages with a hook mounted on the charging port, and a lock release position where the hook is released from engagement with the lock lever;
   a manipulation lever for moving the lock lever from the lock position to the lock release position;
   a connecting link which interconnects the manipulation lever and the lock lever;
   a spring which biases the lock lever toward the lock position; and
   a charging start switch which initiates a charging current transfer start instruction;
   a voltage supply line which supplies an identification voltage, for connection detection, to an output terminal of the external battery charger which is connected to the charging supply connector;
   an electronic controller which comprises:
   a connection detection sensor which detects an electrical connection between the charging supply connector and the charging port in response to a drop in the identification voltage, and a driver for a display readout which displays a first indicator to signify that the charging supply connector and the charging port are electrically interconnected, wherein the lock lever and the connecting link are configured and arranged such that when the lock lever is at the lock release position, at least one of the lock lever and the connecting link interferes with an operation range of the charging start switch to prevent operation thereof; and wherein the display readout is mounted on the charging supply connector.

2. The charging device for an electrically driven vehicle according to claim 1, wherein the connecting link is configured and arranged such that, when the lock lever is at the lock release position, the link interferes with the operation range of the charging start switch.

3. The charging device for an electrically driven vehicle according to claim 1, wherein the charging start switch comprises a manipulation button and a switch body which selectively opens or close a contact in response to pushing-down or returning of the manipulation button, and the operation range of the charging start switch is an operation range of the manipulation button.

4. The charging device for an electrically driven vehicle according to claim 1, wherein a distal end portion of the lock lever is formed into a hook shape which is engageable with the charging port hook, and a gradient is respectively provided to each of the charging port hook and a front surface of the hook-shaped distal end portion of the lock lever, such that the hook-shaped distal end portion moves over the charging port hook and advances to the lock position when the charging supply connector and the charging port are connected to each other.

5. The charging device for an electrically driven vehicle according to claim 4, wherein the charging supply connector and the charging port are electrically connected when the hook-shaped distal end portion of the lock lever moves over the charging port hook and arrives at the lock position.

6. The charging device for an electrically driven vehicle according to claim 5, wherein the electronic controller is operable to permit electric current to flow from the charging supply connector to the charging port in response to an ON manipulation of the charging start switch.

7. The charging device for an electrically driven vehicle according to claim, 5 wherein the electronic controller includes a sensor for detecting that the charging start switch is turned on, and the display readout further displays a second indicator to signify that charging is started in response to an ON manipulation of the charging start switch.

8. The charging device for an electrically driven vehicle according to claim 1, wherein the charging supply connector further comprises a main connector body and a handle grip portion integrally attached to the main connector body, the lock lever is pivotally attached to the main connector body via a first pivot shaft, and the manipulation lever is pivotally attached to the main connector body via a second pivot shaft.

9. The charging device for an electrically driven vehicle according to claim 8, wherein the manipulation lever is substantially parallel to the handle grip portion of the charging supply connector.

10. A charging connection device for an electrically driven vehicle, comprising in combination, a charging port adapted to be mounted on a body of said vehicle, and a charging supply connector for electrically connecting an external battery charger to the charging port, wherein the charging supply connector comprises:

a main connector body and a handle grip portion integrally attached to the main connector body;

a lock lever which is displaceable between a lock position, where the lock lever engages with a hook mounted on the charging port, and a lock release position where the hook is released from engagement with the lock lever;

a manipulation lever for moving the lock lever from the lock position to the lock release position;

a connecting link which interconnects the manipulation lever and the lock lever;

a spring which biases the lock lever toward the lock position; and a charging start switch which initiates a charging current transfer start instruction;

a voltage supply line which supplies an identification voltage, for connection detection, to an output terminal of the external battery charger which is connected to the charging supply connector;

an electronic controller which comprises:

a connection detection sensor which detects an electrical connection between the charging supply connector and the charging port in response to a drop in the identification voltage, and a driver for a display readout which displays a first indicator to signify that the charging supply connector and the charging port are electrically interconnected;

wherein the lock lever is pivotally attached to the main connector body via a first pivot shaft, and the manipulation lever is pivotally attached to the main connector body via a second pivot shaft;

and wherein the lock lever and the connecting link are configured and arranged such that when the lock lever is at the lock release position, at least one of the lock lever and the connecting link interferes with an operation range of the charging start switch to prevent operation thereof:

and wherein the display readout is mounted on the charging supply connector.

11. The charging device for an electrically driven vehicle according to claim 10, wherein the connecting link is configured and arranged such that, when the lock lever is at the lock release position, the link interferes with the operation range of the charging start switch.

12. The charging device for an electrically driven vehicle according to claim 10, wherein the charging start switch comprises a manipulation button and a switch body which selectively opens or closes a contact in response to pushing-down or returning of the manipulation button, and the operation range of the charging start switch is an operation range of the manipulation button.

13. The charging device for an electrically driven vehicle according to claim 10, wherein a distal end portion of the lock lever is formed into a hook shape which is engageable with the charging port hook, and a gradient is respectively provided to each of the charging port hook and a front surface of the hook-shaped distal end portion of the lock lever, such that the hook-shaped distal end portion moves over the charging port hook and advances to the lock position when the charging supply connector and the charging port are connected to each other.

14. The charging device for an electrically driven vehicle according to claim 13, wherein the charging supply connector and the charging port are electrically connected when the hook-shaped distal end portion of the lock lever moves over the charging port hook and arrives at the lock position.

15. The charging device for an electrically driven vehicle according to claim 14, wherein the electronic controller permits electric current to flow from the charging supply connector to the charging port in response to an ON manipulation of the charging start switch.

16. The charging device for an electrically driven vehicle according to claim 14, wherein the electronic controller includes a sensor for detecting that the charging start switch is turned on, and the display readout further displays a second indicator to signify that charging is started in response to an ON manipulation of the charging start switch.

17. The charging device for an electrically driven vehicle according to claim 10, wherein the manipulation lever is substantially parallel to the handle grip portion of the charging supply connector.

18. The charging device for an electrically driven vehicle according to claim 10, wherein the lock lever is connected to the link by a first connecting shaft which is separate from the first pivot shaft, and the manipulation lever is connected to the link by a second connecting shaft which is separate from the second pivot shaft.

19. A charging connection device for an electrically driven vehicle, comprising in combination, a charging port adapted to be mounted on a body of said vehicle, and a charging supply connector which electrically connects an external battery charger to the charging port, wherein the charging supply connector comprises:

a main connector body and a handle grip portion integrally attached to the main connector body;

a lock lever which is displaceable between a lock position, where the lock lever engages with a hook mounted on the charging port, and a lock release position where the hook is released from engagement with the lock lever;

a manipulation lever for moving the lock lever from the lock position to the lock release position;

a connecting link which interconnects the manipulation lever and the lock lever;

a spring which biases the lock lever toward the lock position; and a charging start switch which initiates a charging current transfer start instruction;

a voltage supply line which supplies an identification voltage, for connection detection, to an output terminal of the external battery charger which is connected to the charging supply connector;

an electronic controller which comprises:

a connection detection sensor which detects an electrical connection between the charging supply connector and the charging port in response to a drop in the identification voltage, and can increase a charging current until the voltage output drops to supply a charging current with maximum output;

a driver for a display readout which displays a first indicator to signify that the charging supply connector and the charging port are electrically interconnected;

wherein the lock lever is pivotally attached to the main connector body via a first pivot shaft, and the manipulation lever is pivotally attached to the main connector body via a second pivot shaft;

and wherein the lock lever and the connecting link are configured and arranged such that when the lock lever is at the lock release position, at least one of the lock lever and the connecting link interferes with an operation range of the charging start switch to prevent operation thereof;

and wherein a distal end portion of the lock lever is formed into a hook shape engages with the charging port hook, and wherein a gradient is respectively provided to each of the charging port hook and a front surface of the hook-shaped distal end portion of the lock lever, such that the hook-shaped distal end portion moves over the charging port hook and advances to the lock position when the charging supply connector and the charging port are connected to each other;

and wherein the display readout is mounted on the charging supply connector.

* * * * *